US005146088A

United States Patent [19]

Kingham et al.

[11] Patent Number: 5,146,088

[45] Date of Patent: Sep. 8, 1992

[54] METHOD AND APPARATUS FOR SURFACE ANALYSIS

[75] Inventors: David R. Kingham, Oxford; Alan R. Waugh, Burgess Hill, West Sussex, both of United Kingdom

[73] Assignee: VG Instruments Group Limited, Uxbridge, England

[21] Appl. No.: 630,531

[22] Filed: Dec. 20, 1990

[30] Foreign Application Priority Data

Dec. 21, 1989 [GB] United Kingdom ................. 8928917

[51] Int. Cl.[5] ......................... B01D 50/44; H01J 49/00

[52] U.S. Cl. ..................................... 250/288; 250/282; 250/423 P

[58] Field of Search ............. 250/288, 309, 282, 423 P

[56] References Cited

U.S. PATENT DOCUMENTS

| | | | |
|---|---|---|---|
| 3,521,054 | 7/1970 | Poschemriecle et al. | 250/423 P |
| 4,442,354 | 4/1984 | Hurst et al. | 250/288 |
| 4,454,425 | 6/1984 | Young | 250/423 P |
| 4,633,084 | 12/1986 | Gruen et al. | 250/309 |
| 4,800,273 | 1/1989 | Phillips | 250/309 |
| 4,889,987 | 12/1989 | Gruen et al. | 250/288 |
| 4,988,879 | 1/1991 | Zare et al. | 250/288 |

FOREIGN PATENT DOCUMENTS

| | | |
|---|---|---|
| 1018508 | 1/1966 | United Kingdom . |
| 1210218 | 10/1970 | United Kingdom . |
| 1222577 | 2/1971 | United Kingdom . |
| 2157485 | 10/1985 | United Kingdom . |

*Primary Examiner*—Bruce C. Anderson

*Attorney, Agent, or Firm*—Chilton, Alix & Van Kirk

[57] ABSTRACT

Method and apparatus for analyzing organic material present in a surface region (5) of a sample (1), the apparatus comprising: an evacuable sample receiving chamber (2); means (3) for generating an energetic beam (4) of particles or photons and for directing the beam onto the sample whereby to cause the removal therefrom of at least some organic material into a spatial region (7) proximate to the surface region; means (13) for generating non-coherent ultra-violet radiation (14); and means (13) for directing that radiation into the spatial region to photoionize organic material therein; means (35) for mass analyzing resultant ionized species; and means for conducting ions from the spatial region to the means for mass analyzing.

10 Claims, 1 Drawing Sheet

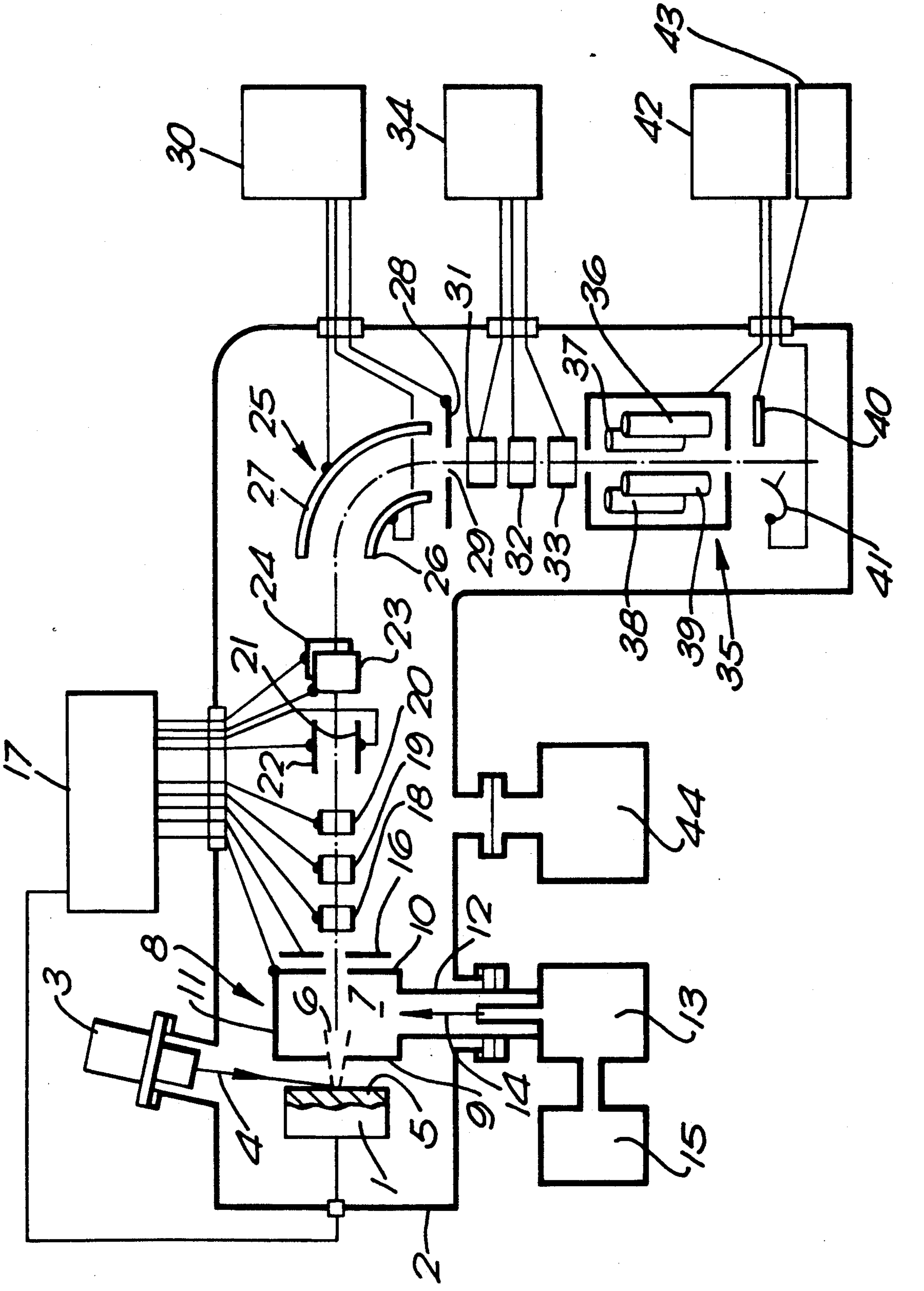
1
2
3
4
5
6
7
8
9
10
11
12
13
14
15
16
17
18
19
20
21
22
23
24
25
26
27
28
29
30
31
32
33
34
35
36
37
38
39
40
41
42
43
44

METHOD AND APPARATUS FOR SURFACE ANALYSIS

BACKGROUND OF THE INVENTION

1. Field of the Invention

This invention relates to an improved method and an improved apparatus for the mass spectrometric analysis of organic material disposed on or within the surface region of a sample.

2. Description of the Prior Art

The surface region of a sample may be analyzed by removing surface material and analyzing that removed material by mass spectrometry. The step of removing sample material may be accomplished in a number of ways generally involving the input of heat, the transfer of momentum or an electronic excitation. For example, in a laser microprobe an intense focused laser probe ablates sample material and provides ions for analysis, as reviewed by R. J. Cotter and J. C. Tabet in American Laboratory 1984,16(4), pages 86 to 99. Laser probes of low power density are particularly advantageous in the analysis of bio-organic molecules as reported by M. A. Posthumus et al in Analytical Chemistry 1978,50(7), pages 985 to 991. Other widely used techniques include secondary ion mass spectrometry (SIMS) and fast atom bombardment (FAB) mass spectrometry wherein a beam of ions or atoms sputters material from a sample, as reviewed by A. Benninghoven et al in SIMS, volume 86 of Chemical Analysis, 1987 published by John Wiley & Sons. Alternatively, electrons or photons may be employed for stimulating desorption from adsorbed layers or from the outermost atomic layers of a sample as described by J. A. Kelber and M. L. Knotek in the Springer Series in Surface Science, 1985, volume 4, pages 182 to 187. Thus there is available a range of techniques for removing and subsequently analyzing material from a range of depths, from the outer monolayer down to several tens or hundreds of microns. Moreover these techniques may be combined with an eroding technique such as ion milling to investigate essentially any desired depth, and in referring to the surface region we mean that the material for analysis is removed from some selectively variable volume at the interface between a sample and its environment, and we are not restricting this term to any particular depth.

The above mentioned techniques generally produce more neutral particles than ions and that neutral emission is not subject to discriminating influences which can make ionic emission unrepresentative of the surface composition. It has long been recognized that it would be advantageous to provide means for postionizing the neutrals to facilitate their analysis by mass spectrometry, and suitable techniques have been reviewed by W. Reuter in the Springer Series in Chemical Physics 1986, 44 pages 94 to 102 and by A. Benninghoven et al (op cit 1987) pages 937 to 949. Postionization by an electron beam is described by R. E. Honig in the Journal of Applied Physics 1958, 29(3), pages 549 to 555; by A. J. Smith in the Journal of Applied Physics 1963, 34, pages 2489 to 2490; by D. Lipinsky et al in the Journal of Vacuum Science and Technology, 1985, A3, pages 2007 to 2017; and by I. R. M. Wardell in U.S. Pat. No. 3,660,655. A disadvantage of electron beam postionization is that it provides a low ion yield, given by W. Reuter as $10^{-9}$ ions per atom. Postionization by an electron gas or by a plasma has also been reported with ion yields according to W. Reuter of $10^{-9}$ and $10^{-7}$ respectively, whereas more satisfactory yields in the region of $10^{-2}$ to $10^{-4}$ are reported for by various laser beam postionization techniques. Prior to this laser work, photoionization by light from spark or other discharge lamps had been employed in the analysis of gaseous and thermally evaporable samples as reported for example by W. Genuit and J. J. Boon in the Journal of Analytical and applied Pyrolysis 1985, 8, pages 25 to 40; by M. E. Akopyan et al in Instrum Exp Tech 1972, 15(2), pages 1481 to 1482; in U.S. Pat. Nos. 3,521,054, 4,028,617 and 4,476,392; and as reviewed by N. W. Reid in the International Journal of Mass Spectrometry and Ion Physics 1971, 6, pages 1 to 31. Such photoionization mass spectrometry is generally compared unfavorably with electron impact ionization mass spectrometry because of its low ion yield, as described by W. Poschenrieder and P. Warneck in the Journal of Applied Physics 1966, 37(7), pages 2812 to 2820. D. F. Hunt in The International Journal of Mass Spectrometry and Ion Physics 1982, 45, pages 111 to 123 points out that lasers are required to provide a sufficiently high photon flux as exemplified by the work of M. Seaver et al in the International Journal of Mass Spectrometry and Ion Physics 1980, 34, pages 159 to 173 and reviewed by R. J. Cotter in Analytica Chimica Acta 1987, 195, pages 45 to 59.

Techniques for laser postionization of sputtered neutrals are generally categorized as using either resonant or non-resonant ionization. Resonant ionization occurs when the laser frequency is such that its associated photon energy matches the energy required to induce at least one electronic transition in the ionizing process. Several suitable resonance schemes are described by J. E. Parks et al in Thin Solid Films 1983, 108(2), pages 69 to 78, and the technique has been described variously by D. W. Beekman et al in the International Journal of Mass Spectrometry and Ion Physics 1980, 34, pages 89 to 97; by N. Winograd et al in Chemical Physics Letters 1982, 88(6), pages 581 to 584, and in U.S. Pat. No. 4,442,354. In this technique the ionizing laser is tuned to correspond to a resonant transition and thus produces enhanced ionization with high selectivity of the ionized species in the presence of other substances for which the resonance condition is not satisfied. Such selectivity can be advantageous but requires some knowledge of the composition of a sample in advance of the analysis. By contrast a technique based on non-resonant ionization as reported by C. H. Becker et al in U.S. Pat. No. 4,733,073 is inherently non-selective.

In Analytical Chemistry 1984, 56, pages 1671 to 1674, C. H. Becker et al give the major requirement of their non-resonant ionization technique as being a laser intensity high enough to achieve significant ionization probabilities. Non-resonant multi-photon ionization proceeds by a series of transitions to one or more virtual states which are not true eigenstates of the atom but between which transitions are possible in a very high light intensity as described by N. B. Delone in Soviet Physics Usp 1975, 18(3), pages 169 to 189. C. H. Becker et al have reported single photonionization studies of the surfaces of bulk polymers, and of molecular adsorbates, respectively in the Journal of Vacuum Science and Technology A 6(3), 1988, pages 936 to 940 and the Journal of the American Chemical Society 1988, 110, pages 2323 to 2324. Arrangements for the laser postionization of sputtered neutrals have also been reported in PCT Patent Applications Nos. W087/07762 and W088/06060 covering both resonant and non-resonant ionization processes.

SUMMARY OF THE INVENTION

It is an object of this invention to provide an improved method for the mass spectrometric analysis of organic material at the surface of a condensed phase (i.e. non-gaseous samples), and it is a further object to provide an improved apparatus for carrying out that method.

According to one aspect of the invention there is provided a method of analyzing organic material present in a surface region of a condensed phase sample, said method comprising: directing an energetic beam of particles or photons onto said surface region whereby to cause the removal therefrom of at least some of said organic material into a spatial region(the ionization volume) proximate to said surface region, directing non-coherent ultra-violet radiation into said ionization volume whereby to photoionize at least some of the organic material disposed therein, and mass ionizing photoionized species thereby produced.

The term non-coherent ultra-violet radiation as used herein refers to non-laser electromagnetic radiation in the ultra-violet range (typically about $10^{15}$ Hz to $10^{17}$ Hz frequency), and the method preferably involves providing that radiation from a non-coherent source such as a microwave, spark or continuous DC discharge source charged for example with helium, neon, argon or xenon; these examples however are not exhaustive and other radiation sources, e.g. a synchrotron radiation source, may be used.

The step of photoionizing the organic material preferably comprises selectively photoionizing that material, by which it is meant that the method is inherently efficient for ionization of organic substances and will favour the photoionization of organic material in the presence of inorganic material such as from the sample, its local environment (e.g. a sample holder) or the residual gas of the vacuum environment. This is not like prior techniques of selective ionization in which a laser source is tuned to a particular frequency. The high efficiency may be due at least in part to the broadening of energy levels in organic molecules which increases the pathways available for ionizing transitions, and to single photon ionization via autoionizing states (which are unstable states to which a molecule may be energized above the highest normally bound state and from which it spontaneously decays). In this context the ionization process may be termed resonant, by which it is meant that the frequency of the ionizing radiation corresponds to a required transition energy without the creation of intermediate virtual states as in so-called non-resonant ionization. Irrespective of the nature of the ionization mechanism the high efficiency of ionization by non-coherent radiation in the method of the invention is surprising in view of the prior emphasis on intense laser radiation.

The method may comprise providing ionizing ultra-violet radiation from more than one source, thereby inducing selective ionization in organic molecules by a plurality of exciting frequencies and thus providing an enhanced ion yield. Alternatively, further selectivity such as between different organic species may be achieved by tuning, monochromatizing, filtering or otherwise selecting the frequency of the photoionizing radiation.

In preferred embodiments the energetic material-removing beam is distinct from the photoionizing radiation and may comprise particulate or electromagnetic radiation such as ions, atoms, molecules or electrons, or photons from either a coherent (laser) or non-coherent (non-laser) source. Alternatively the energetic beam may comprise the photoionizing radiation and may be directed from the source of that radiation; thus the photoionizing step may be carried out by the material-removing beam where that beam comprises non-coherent ultra-violet radiation. The step of removing surface material may comprise thermal processes, sputtering (momentum-transfer) or electronic excitation and desorption processes.

Following photoionization, the ionized species will conveniently be transported, with the ionized organic material being in the form of molecular ions, to a mass analyzer where the mass analysis is effected.

Preferably the step of transporting the molecular ions towards the mass analyzer comprises extracting ionized material from the ionization volume, conveniently by applying accelerating electric potentials to one or more electrodes, which may include the sample, in the vicinity of the ionization volume. Preferably also the method comprises controlling the potential of the ionization volume, typically by applying and controlling a voltage to conductive members such as electrodes or a cage around that volume, and thereby controlling the potential at which ions are formed therein. Thus the method may comprise photoionizing the removed organic material in the ionization volume at a controlled electric potential. The method preferably also comprises maintaining the sample at a higher potential than the ionization volume and thereby ensuring that ions formed directly by the action of the energetic beam at the sample have a higher minimum potential energy than molecular ions formed within the ionization volume. The method further preferably comprises a step of energy filtering the material extracted from the ionization volume.

The step of mass analyzing the molecular ions may be carried out by any one or a combination of techniques such as quadrupole, magnetic sector or time-of-flight mass spectrometry. The first two of these are compatible with substantially continuous ion production, whereas time-of-flight analysis requires pulsed operation which may be achieved for example by pulsing the photoionizing radiation (in which case a spark source may be advantageous), by pulsing the potentials which accelerate the ions from the ionization volume, or by chopping, gating or otherwise periodically interrupting the passage of ions from the ionization volume to an ion detector.

According to another aspect of the invention there is provided an apparatus for analyzing organic material present in a surface region of a sample, said apparatus comprising: an evacuable sample receiving chamber; means for generating an energetic beam of particles or photons and for directing said beam onto a sample disposed in said chamber whereby to cause the removal therefrom of at least some of said organic material into a spatial region (the ionization volume) proximate to said surface region; means for generating non-coherent ultra-violet radiation; and means for directing said radiation into said spatial region to photoionize organic material therein; means for mass analyzing resultant ionized species; and means for conducting ions from said spatial region to said means for mass analyzing.

Preferably the means for conducting ions is an ion optical transporting means, e.g. comprising means for extracting ions from the ionization volume, generally comprising at least one electrode defining an aperture through which the ions may pass. For example, the ionization volume may lie between the sample and a first apertured electrode adjacent the sample, and the apparatus comprises means for applying electric potentials to the sample and first electrode for accelerating the ions in the ionization volume away from the sample and towards and through the aperture defined by the electrode. Alternatively the ionization volume lies between the first electrode and an adjacent downstream second electrode, and potentials are applied either between those electrodes, or between those electrodes and further downstream electrodes for accelerating the ions away from the sample and ionization volume. The ionization volume may be at least partially bounded by said first and second electrodes maintained at a common potential, or there may be provided an enclosure such as a cage, and means for controlling the electric potential of that enclosure, thereby controlling and defining the electric potential of the ionization volume. In an especially preferred embodiment the ionization volume is enclosed by an enclosure comprising said first and second entrance electrodes joined by a substantially cylindrical wall which is open to a tube along which the ionizing non-coherent light may be directed from the source into the ionization volume. The apparatus preferably comprises means for maintaining the sample at a different and preferably higher potential than the ionization volume. The ion optical means preferably also further comprises elements such as lenses or deflectors for focusing, steering or otherwise directing or conditioning ions in transporting them from the ionization volume to the mass analyzer.

In a further preferred embodiment the apparatus also comprises an energy filter disposed between the ionization volume and the mass analyzer for discriminating against unwanted ions. Preferably a low-pass filter is provided to discriminate against sample ions (produced by direct impact of the energetic beam at the sample) which have a higher energy than the molecular ions produced in the ionization volume. A high-pass (threshold) filter may be provided to discriminate against any low energy ions, which may originate in the residual gas for example. Both of these requirements may be satisfied by providing a band-pass filter such as an electrostatic 90° analyzer.

BRIEF DESCRIPTION OF THE DRAWING

The present invention may be better understood, and its objects and advantages will be apparent to those skilled in the art by reference to the accompanying drawing which schematically illustrates apparatus for surface analysis in accordance with the present invention, the drawing being considered in conjunction with the following description.

DESCRIPTION OF A PREFERRED EMBODIMENT

A preferred embodiment of the invention will now be described in greater detail by way of example and with reference to the accompanying FIGURE which shows an apparatus for surface analysis of samples comprising organic material according to one aspect of the invention.

The FIGURE illustrates an apparatus for surface analysis in which a sample 1 is disposed within an enclosure 2. A beam source 3 generates and directs an energetic beam 4 towards a surface region 5 of sample 1 and thereby removes surface material 6 into an ionization volume 7. In this example the beam 4 comprises metallic ions directed from a liquid metal ion source, whereas in alternative embodiments beam 3 may comprise other ions, electrons, atoms, molecules or ultra-violet radiation. The ionization volume 7 is partially enclosed by a cage 8 which comprises first and second apertured electrodes 9 and 10 and a cylindrical wall 11. Wall 11 is open to a cylindrical tube 12 along which a discharge source 13 directs non-coherent (non-laser) ultra-violet radiation 14 into volume 7. A suitable type of source 13 is the UVL-100 ultra-violet source available from VG Microtech Ltd of Uckfield England, and supplies radiation in the range from 11.7 eV (ArII) to 48.4 eV (HeIII) when charged with argon, neon, or helium. The source 13 is differentially pumped by a source pumping system 15. Ions formed from removed surface material 6 by the action of ultra-violet radiation 14 are extracted from ionization volume 7 by applying a potential difference between cage 8 and a downstream apertured electrode 16. A power supply 17 maintains sample 1, cage 8, electrode 16, and other elements to be described, at suitable voltages.

Typically, in the analysis of positive ions, sample 1 is maintained at around +50 V with cage 8 at around +10 V, which ensures that any SIMS-type sample ions produced directly by the action of beam 4 at surface region 5 have a minimum energy distinctively greater than ions generated in volume 7. Electrode 16 is controlled at around −50 V to −100 V in order to extract ions from volume 7. A series of optical elements 18, 19 and 20, the last of which is typically at around −1.5 kV, focuses and accelerates the extracted ions. Towards an energy filter 25. X-Y deflectors 21 to 24 are also provided as shown for steering the ions. Energy filter 25 which comprises inner and outer 90° sectors 26 and 27 together with an electrode 28 having an energy selecting slit 29. A power supply 30 controls the potentials of sectors 26 and 27 to direct ions within a selected energy band of typically from 1 eV to 20 eV width towards slit 29. The selected energy band is variable and is adjusted to discriminate against the aforementioned SIMS-type sample ions and any lower energy residual gas ions. Ions emerging from aperture 29 pass to a further series of optical elements 31, 32 and 33 the last of which is close to ground potential, as controlled by a power supply 34, which retard the ions and transport them to a quadrupole mass analyzer 35. Mass analyzer 35 comprises rods 36 to 39, a deflector 40 and an off-axis channeltron detector 41. A power supply controls analyzer 35 to produce a mass spectrum from a data system 43. Negative ions may be studied by suitable reversals of the potentials as will be understood. It will also be appreciated that the FIGURE is schematic and, for example, the power supplies may be provided in a different configuration while retaining the same functions in principle. The vacuum enclosure 2 is pumped to a high or ultra-high vacuum by means of a pumping system 44.

In contrast to prior methods and apparatus for surface analysis in which surface material is removed and then photoionized, our method employs non-coherent (non-laser) radiation and is particularly efficient and selective of organic material. This provides significant advantages of cost and simplicity over prior techniques, although its efficacy is surprising in view of prior emphasis on the use of intense laser radiation.

We claim:

1. A method of analyzing organic material/molecules present in a surface region of a condensed phase sample, said method comprising: directing an energetic beam onto said surface region whereby to cause the removal therefrom of at least some of said organic material into a spatial region proximate to said surface region, directing continuous noncoherent ultraviolet radiation into said spatial region whereby to photoionize at least some of the organic molecules disposed therein, and mass analyzing photoionized species thereby produced.

2. A method as claimed in claim 1 in which the step of photoionizing said organic material comprises selectively photoionizing that material.

3. A method as claimed in claim 1 in which the step of photoionizing said organic material comprises resonantly photoionizing that material.

4. A method as claimed in claim 1 further comprising controlling the electric potential of said spatial region by controlling a voltage applied to conductive members disposed about said spatial region whereby to control the potential at which ions are formed therein.

5. A method as claimed in claim 1 comprising photoionizing said removed organic material in said spatial region at a controlled electric potential; maintaining said condensed sample at a higher potential than said spatial region whereby to cause ions formed by the action of said energetic beam on said condensed sample to have a higher minimum potential energy than molecular ions formed with said spatial region and energy filtering material passing from said spatial region.

6. An apparatus for analyzing organic material/molecules present in a surface region of a sample, said apparatus comprising: an evacuable sample receiving chamber; means for generating an energetic beam of particles or photons and for directing said beam onto a sample disposed in said chamber whereby to cause the removal therefrom of at least some of said organic material into a spatial region proximate to said surface region; means for generating continuous non-coherent ultra-violet radiation; means for directing said radiation into said spatial region to photoionize organic molecules therein; means for mass analyzing resultant ionized species; and means for conducting ions from said spatial region to said means for mass analyzing.

7. An apparatus as claimed in claim 6 comprising means for controlling the electric potential of said spatial region and means for maintaining said sample at a higher potential than said spatial region.

8. An apparatus as claimed in claim 7 further comprising energy filtering means disposed between said spatial region and said means for mass analyzing, said energy filtering means comprising a low-pass filter for discriminating against ions produced by direct impact of said energetic beam on said sample, and a high-pass filter for discriminating against ions originating from residual gas present in said sample receiving chamber.

9. An apparatus as claimed in claim 6 comprising an enclosure member substantially defining said spatial region and means for controlling the electric potential of said enclosure member whereby to control and define the electric potential of said spatial region.

10. An apparatus as claimed in claim 6 further comprising energy filtering means disposed between said spatial region and said means for mass analyzing, said energy filtering means comprising a low-pass filter for discriminating against ions produced by direct impact of said energetic beam on said sample, and a high-pass filter for discriminating against ions originating from residual gas present in said sample receiving chamber.

* * * * *